United States Patent [19]

Clerici Bagozzi

[11] 4,079,499
[45] Mar. 21, 1978

[54] METHOD FOR MANUFACTURING TAPE RECORDER CASSETTES AND CASSETTE OBTAINED THEREBY

[76] Inventor: Ottaviano Clerici Bagozzi, Via Colauti, 1, Milan, Italy

[21] Appl. No.: 586,773

[22] Filed: Jun. 13, 1975

[30] Foreign Application Priority Data

Jun. 14, 1974 Italy .................................. 24001/74

[51] Int. Cl.² ........................................... B23P 11/02
[52] U.S. Cl. ...................................... 29/453; 29/463; 242/199
[58] Field of Search ......................... 29/434, 463, 453; 113/120 E, 120 H, 120 R; 242/199; 72/347

[56] References Cited

U.S. PATENT DOCUMENTS

| | | | |
|---|---|---|---|
| 1,223,849 | 4/1917 | Berry | 72/347 X |
| 1,839,064 | 12/1931 | Thornton | 242/199 |
| 1,848,715 | 3/1932 | Hart et al. | 29/453 UX |
| 1,942,935 | 1/1934 | Reutter | 29/463 UX |
| 2,022,353 | 11/1935 | Kindelmann et al. | 242/199 |
| 2,118,896 | 5/1938 | Pearlman et al. | 242/199 |
| 3,420,032 | 1/1969 | Felt | 29/453 UX |
| 3,934,842 | 1/1976 | Posso | 242/199 |

Primary Examiner—Charlie T. Moon
Attorney, Agent, or Firm—Guido Modiano; Albert Josif

[57] ABSTRACT

The invention relates to a method for manufacturing tape cassettes and to the cassettes obtained thereby. The cassettes are made of metallic material which undergoes a series of blanking and drawing operations to obtain two mutually connectable shells, with engagement means for their assembly and an insert element for guiding the tape to be arranged in the front portion of the cassette between the two shells to be connected.

3 Claims, 14 Drawing Figures

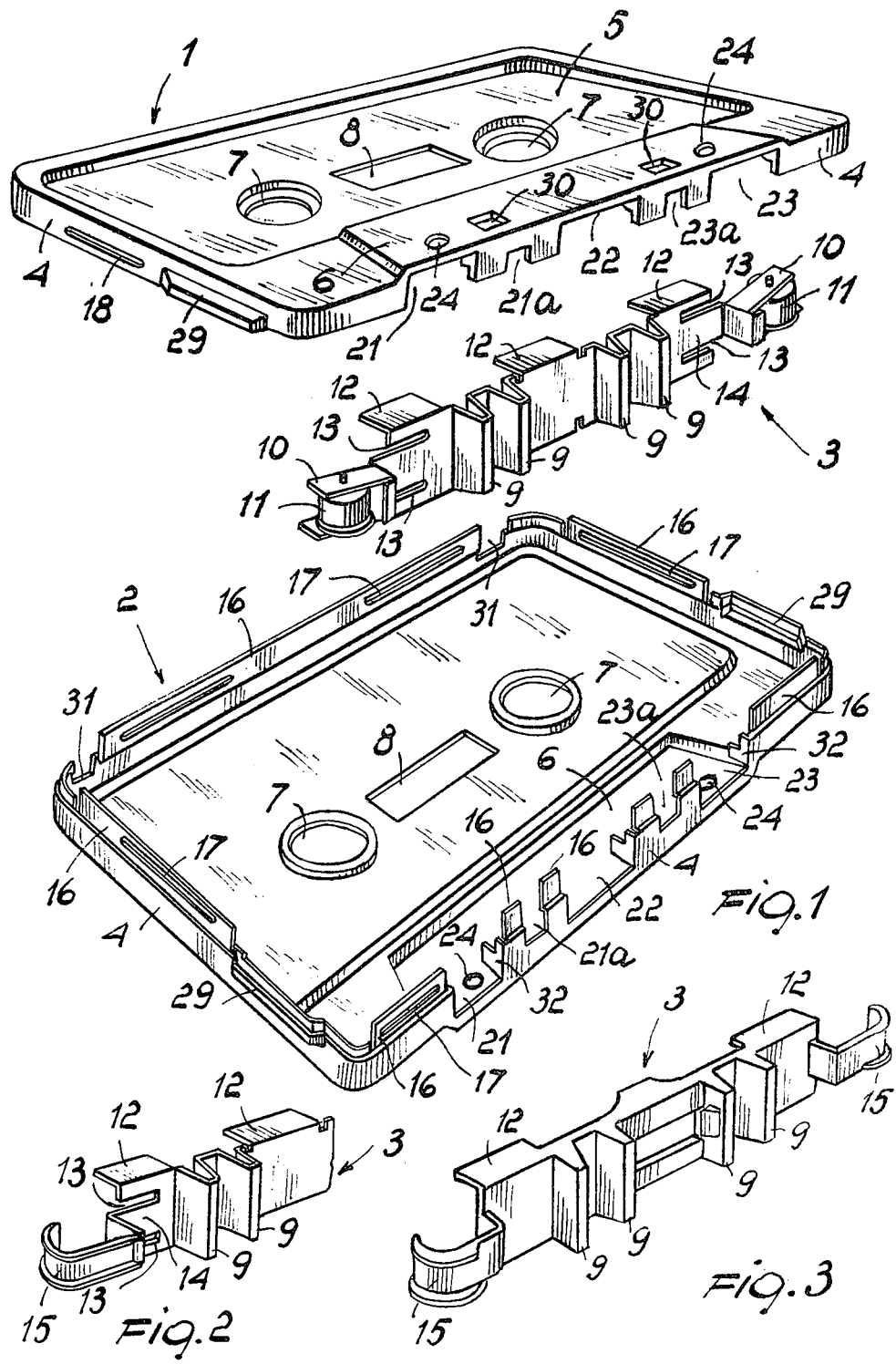

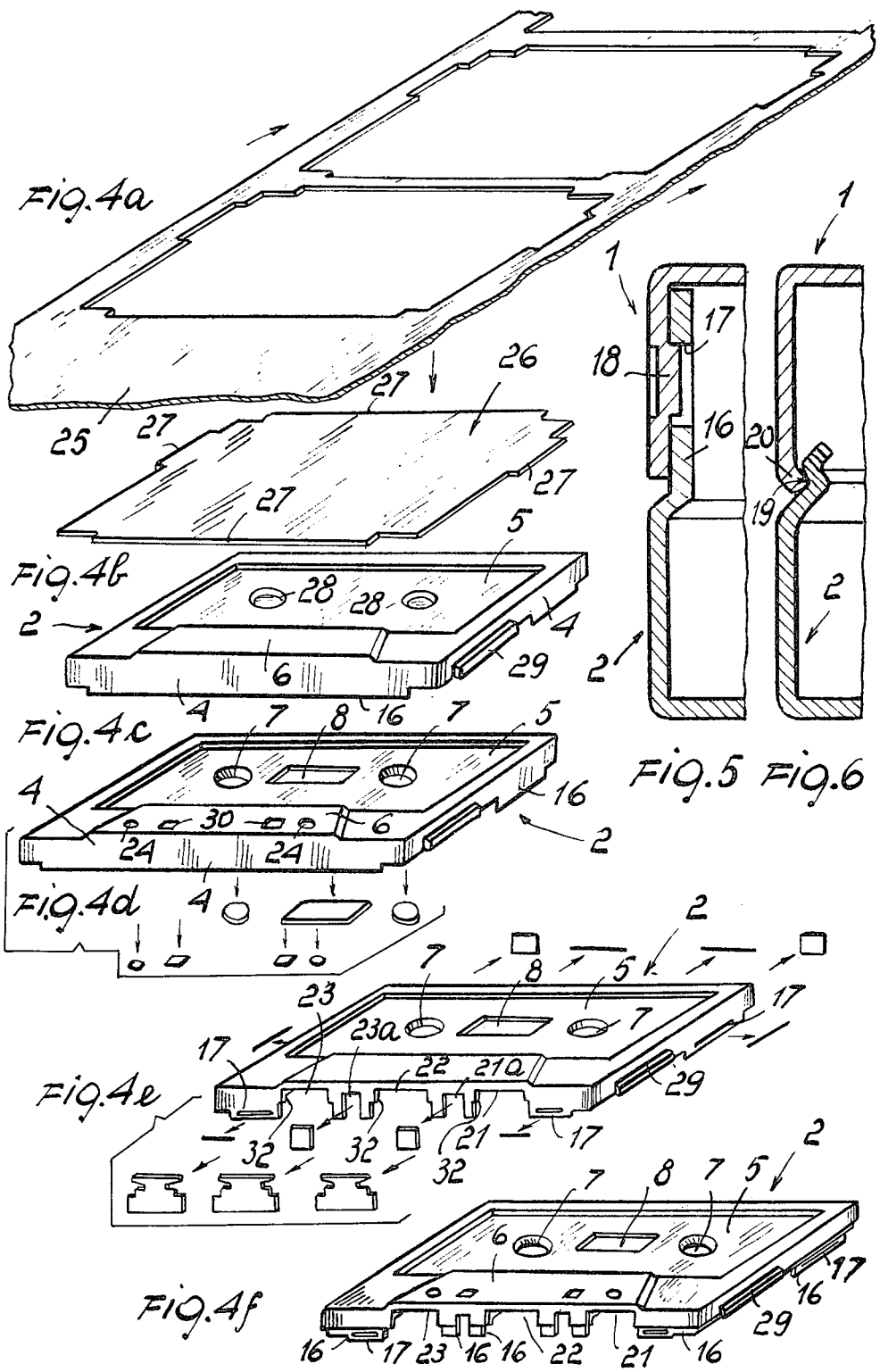

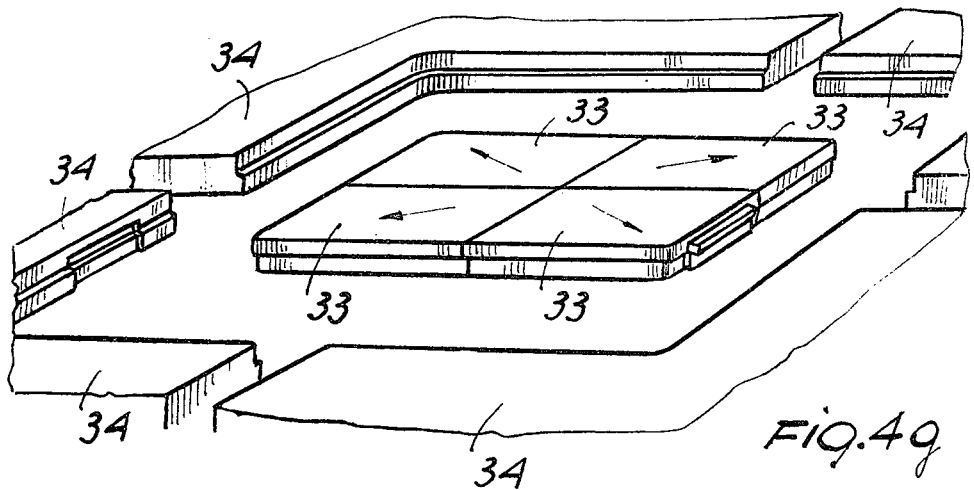
Fig. 49
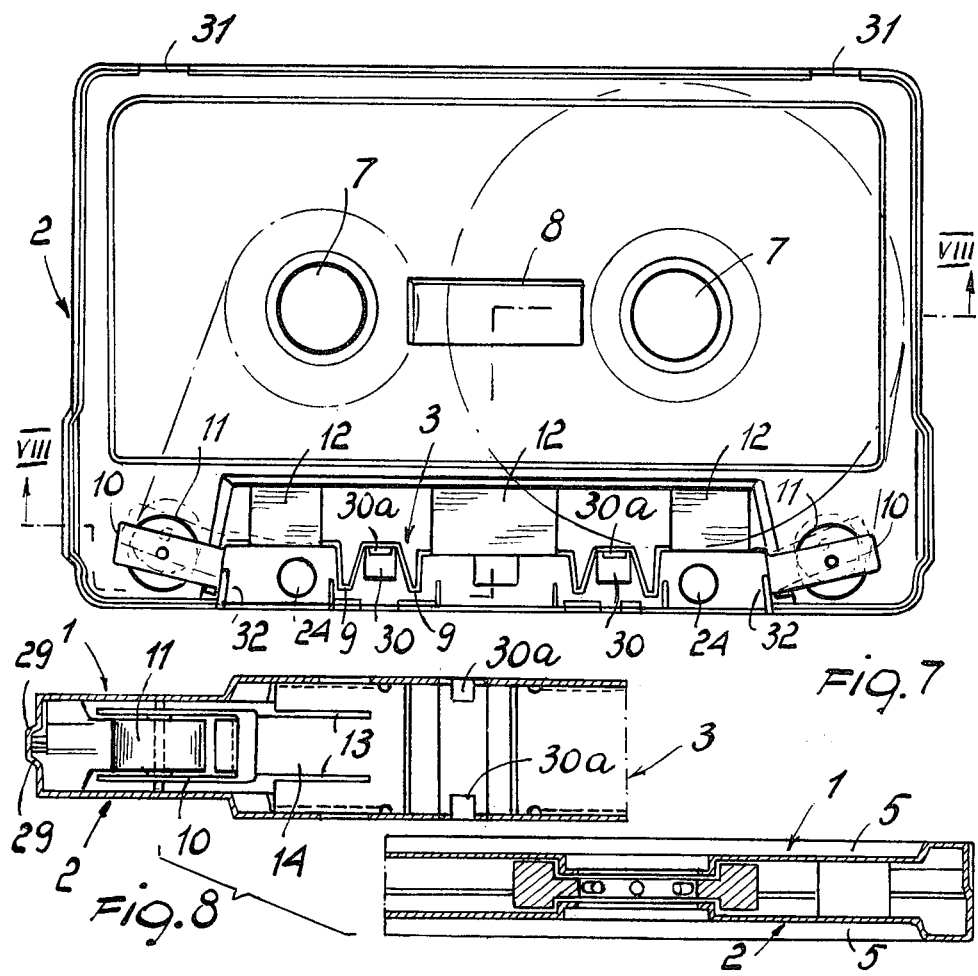
Fig. 7
Fig. 8

METHOD FOR MANUFACTURING TAPE RECORDER CASSETTES AND CASSETTE OBTAINED THEREBY

BACKGROUND OF THE INVENTION

The present invention relates to a method for manufacturing tape recorder cassettes and to the cassette obtained by the method.

At present tape recorder cassettes consist of two halves or shells of plastics material, obtained by molding and connected together by means of screws or by snap engagement. The two shells are molded already with the auxiliary parts, such as the guides for the tape, in a single piece with a sole molding operation. This undoubtedly constitutes an advantage and reduces to a minimum the work involved with the assembly of the complete cassette.

It is however necessary to observe that the molding of the shells requires a relatively long time, in that it is necessary to wait each time until the material has sufficiently cooled down before removing the molded shell from the mold. Therefore it is not possible to reduce in any marked way the time involved in molding each single shell. Together with this limitation, there is also the ever increasing price of plastics material, which negatively influences production costs.

SUMMARY OF THE INVENTION

The main object of the present invention is to provide a method by which it is possible to manufacture tape cassettes not only in a shorter time than that required at present, but also at a lower cost.

Another object of the invention is to provide a method and a cassette producible in large quantities and with means for connecting the shells already incorporated so as to be easily assembled.

A further object of the present invention is to provide a cassette which has a greater mechanical rigidity than the ones presently on the market, which is insensitive to heat and which does not allow the accumulation of electrostatic charges, as occurs instead with cassettes presently on the market.

To attain the above objects, it is proposed, according to the invention, to make the cassette of metal instead of plastics material and there is proposed a method in which each single shell is obtained starting from metal plate or the like.

The method according to the invention is characterized in that it comprises cutting out from a metallic plate or the like at least a piece with substantially the dimensions of one of the cassette shells, drawing the piece to form the side walls of the shell and to shape the major surfaces, blanking openings in the piece for the tape winding and unwinding hubs and for the magnetic heads, pressure roller and drive spindle, shaping mutual conjugate engagement means for the shells in the side walls thereof, as well as forming an insert element with guide surfaces for the tape and arranging said insert element in the front portion between the two shells to be connected.

The cassette according to the invention is characterized in that it comprises two shells of metallic material and an insert element arranged between the shells near the front portion thereof and provided with guide surfaces for the tape, said shells and said insert element having conjugate means for their mutual removable connection.

BRIEF DESCRIPTION OF THE DRAWINGS

Further characteristics and advantages of the invention will be more apparent from the following detailed description of a few embodiments thereof, given by way of example and illustrated in the accompanying drawings, in which:

FIG. 1 is an enlarged view of the cassette according to the invention before assembly;

FIGS. 2 and 3 are respectively two different embodiments of the insert element provided in the cassette according to the invention;

FIGS. 4a, 4b, 4c, 4d, 4e, 4f, and 4g show one of the shells of the cassette according to the invention in the various subsequent steps involved in the method according to the invention;

FIGS. 5 and 6 are two embodiments of the conjugate mutual engagement means of the shells;

FIG. 7 is a plan view of the cassette according to the invention with the upper shell removed; and FIG. 8 is a slightly enlarged view in section of two parts of the finished cassette, the section being on the line VIII—VIII of FIG. 7.

DESCRIPTION OF A PREFERRED EMBODIMENT

The cassette according to the invention consists of a first shell 1 and a second shell 2 of metallic sheet material (see in particular FIG. 1), and of an insert element 3 to be arranged between the facing shells near the front portion of the cassette. The two shells have like major sides, but differ in the side walls 4, where they have respectively removable conjugate mutual engaging means, which will be described further on. On their major sides the two shells 1 and 2 are shaped exactly like conventional plastics cassettes and have a central depression 5, a front relief 6, two holes 7 for receiving the tape winding and unwinding hubs provided in the tape recorder and eventually a central opening 8 for locating the position of the tape.

The two shells 1 and 2 are preferably made of brushed or anodized aluminium of various coloring, of stainless steel, preferably lead stainless steel, or of normal plate. In this case the material is advantageously treated, for example painted, chromium plated, zinc plated, nickel plated, etc. It is however understood that also other metallic materials may be employed for the shells 1 and 2.

The insert element 3 consists preferably of sheet metal formed by bending and blanking to form the front guide and support surfaces 9 for the tape and the supports 10 for the tape guide rollers 11. The insert element also has upper and lower ears 12 for its removable assembly between the shells 1 and 2 on assembly of the cassette. Advantageously, at the end portions of the insert element 3, there are provided lightening notches 13, which define therebetween tabs 14 bearing the supports 10 and which have cross dimensions and thickness such as to confer a certain elasticity to the end portions supporting the rollers 11, which proves very useful for absorbing impacts at the end of the winding operation. The same material may be employed for the insert element as was used for the shells 1 and 2.

The insert element represented in FIG. 2 differs from the one illustrated in FIG. 1 exclusively for the absence of the rollers which are replaced by a continuous guide 15, curved at its free end. The insert element illustrated in FIG. 3 is instead in the form of a single block of plastics material, though substantially maintaining the same shape of the insert element of FIG. 2.

To ensure the connection between the two shells 1 and 2, one of the two shells is provided with side walls or portions thereof extending beyond half the height of the complete cassette. These sections, generally indicated by 16, are recessed by an extent substantially equal to the thickness of the side walls 4. Snap engagement means which couple with side walls 4 of the opposite shell, are formed on these portions.

In the FIGS. 5 and 6, two preferred examples of such means are illustrated.

According to FIG. 5, the portions 16 are provided with seats 17, preferably in the form of elongated slots, and projections 18, intended to engage by snapping with the seats 17, are blanked in the corresponding side walls of the other shell. This type of connection is provided on the four sides of the cassette. Seats 17 and projections 18 extend along a portion of the length of the side walls.

According to FIG. 6, the portions 16 are shorter and are initially bent inwards and then at right angles in two opposite directions. The bent extremity 20 of the side wall of the opposite shell is engaged by snapping in the seat 19 formed by the first right angle bending.

The described engagement means allow also the opening of the assembled cassette in the event that certain defects in the winding of the tape have to be eliminated or for various inspections.

In the front side walls of each shell there are also provided semi-openings 21, 22 and 23 respectively for the magnetic heads and for the pressure roller, and slots 21a and 23a. Holes 24 for the drive spindle are provided in the reliefs 6.

For manufacturing the cassette consisting of the described elements, the following procedure is followed.

A piece 26 of substantially the same dimensions as the cassette is blanked from sheet metal or the like 25 at a blanking station (FIGS. 4a and 4b). The shell 2 is considered first and in this case the cut out piece has also projecting portions 27 on the four sides. Subsequently, the piece is drawn (FIG. 4c) at a drawing station to form the side walls 4, the depression 5 and the relief 6 as well as two circular recesses 28 and the reliefs 29. From the drawing station, the piece, already indicated as 2, moves on to further blanking station (FIG. 4d), in which preferably only the vertical blankings to form the holes 7 for the winding and unwinding hubs, the opening 8 for locating the position of the tape and the holes 24 for the pressure roller of the tape recorder as well as other two holes 30 for securing the cassette in the tape recorder, are initially carried out.

The shell then passes on to a horizontal blanking station (FIG. 4e), where the front semi-openings 21, 22 and 23, the slots 21a and 23a, the seats 17 for the type of connection illustrated in FIG. 5 and the rear slots 31 provided for recorded cassettes, are formed. Advantageously, in blanking the above mentioned semi-openings, portions of the wall sections not corresponding exactly to the rectangular openings, but having the shape shown in FIG. 4e are removed. The remaining strips 32 are bent inwards immediately after the blanking and serve to hold the insert 3. The same applies for the holes 30, which retain tabs 30a subsequently bent inside the shell to hold the insert 3.

After blanking, the shell 2 arrives at a finishing station for drawing (FIGS. 4f and 4g). Here, the means for the mutual engagement are finished and the sections 16 for the portion projecting beyond the height of the side walls, i.e. beyond half the height of the complete cassette are pushed in by an extent substantially equivalent to the thickness of the side walls. In fact it involves forming on the side walls the seats 17 or the bendings of th extremities as illustrated in FIGS. 5 and 6. For this operation, there is provided a die consisting of at least four internal portions 33 expansible towards an equivalent number of external portions 34, or vice versa, to secure the shell and to carry out the required deformations.

In order to form the shell 1, almost the same procedure is followed except that the first blanking determines the formation of a perfectly rectangular piece 26 and the last drawing step includes only the formation of the drawn projections 18 or the bending of the extremities 20 since for this shell, the portions 16 extending beyond half-way are not provided.

The metallic insert 3 is obtained also by blanking a sheet metal material as described, so as to form a piece with the same configuration as illustrated in FIG. 1 and 2. With a subsequent blanking the ears 12 and the tabs 14 with the supports 10 remain and with a subsequent bending the surfaces 9 are formed and the supports 10 for the rollers 11.

The assembly of the shells and of the insert to form the cassette is immediate, due to the shape of the parts. The insert is withheld by the ears 11 and by the more external bent strips 32 as well as by the end wall of the relief 6 and by the bent strips 30a, as illustrated in FIG. 7. This figure shows in hatching the position to which the end portions of the insert 3 may extend under the action of a sudden arrest at the end of winding (or unwinding), thus reducing the stresses on the tape. The assembly may be advantageously carried out automatically at an assembly station.

As illustrated in FIG. 4a, the machining is continuous and after blanking the piece 26, the sheet metal 25 is made to advance by a certain length for the blanking of another piece and so on, while the first piece is transferred from one station to another and subjected to other machining operations. It is thus possible to obtain a much higher production rate than fact, obtainable with plastics cassettes. In that there are no delays for cooling since there is not provided any heating step and all the elements are cold formed. In a length of time equivalent to that presently required to obtain a plastics cassette, it is possible to obtain at least ten cassettes according to the invention with the process of the invention.

With the described process and cassette, the objects of the invention are perfectly attained. There is in fact a greater production rate with equipment at a lower cost, as well as a lower cost for the materials employed, a greater machining precision and a greater uniformity of measurements. The cassette is moreover insensitive to heat, does not allow the accumulation of electrostatic charges and has a greater mechanical rigidity. In the event that metallic materials with a high screening capacity are used, there is also provided a greater protection of the tape from magnetic fields. Even the advance of the tape is improved because of the sliding of the tape pulleys on metal.

The described invention is susceptible to numerous modifications and variants all falling within the scope of the inventive concept. Thus for example, the engagement means for the shells may be different from the ones illustrated or there may also be provided an only blanking station at which the vertical and horizontal blankings are carried out in succession.

I claim:

1. A method for manufacturing a tape recorder cassette comprising two shells facing each other for guiding the tape, the method including the steps of cold forming said shells by cutting out from a sheet metal a first and a second piece each having dimensions slightly larger than those of a corresponding one of said cassette shells, drawing said pieces to form side walls of said shells and to shape the major surfaces of said shells extending orthogonally to said side walls, blanking openings in said major surfaces and said side walls, at positions adapted to receive respectively a tape winding and unwinding hub, drive spindle, pressure roller and a magnetic head of a tape machine having a recording and/or playback head, shaping mutual conjugate engagement means for said shells in said side walls, and cold forming an insert element of sheet metal providing thereon guide surfaces for the tape, arranging said insert element between said shells near the front portions thereof and assembling said shells facing each other.

2. A method as claimed in claim 1, wherein the sheet metal piece corresponding to one of said shells is blanked to obtain a rectangular piece having portions at the four sides projecting beyond the height of said side walls, said portions being recessed by an extent substantially equivalent to the thickness of said side walls, said portions being drawn to provide seats for removably receiving corresponding projections in the side walls of the other of said shells.

3. A method as claimed in claim 1, further including the step of machining end portions in said insert element having cross dimensions and thickness allowing resilient displacement of said end portions under the action of a tensioned tape.

* * * * *